Figure 1:
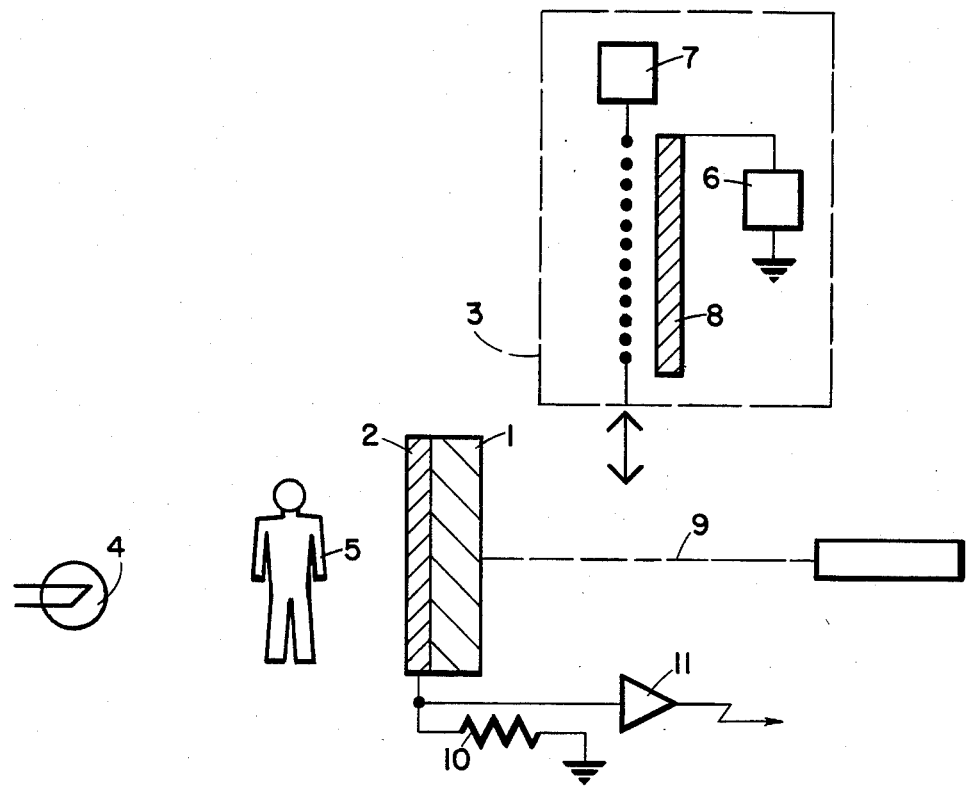

United States Patent [19]

Arnold et al.

[11] Patent Number: 4,542,405
[45] Date of Patent: Sep. 17, 1985

[54] METHOD AND APPARATUS FOR DISPLAYING AND READING OUT AN IMAGE

[75] Inventors: Emil Arnold, Chappaqua; Barry M. Singer, New York, both of N.Y.

[73] Assignee: North American Philips Corporation, New York, N.Y.

[21] Appl. No.: 505,602

[22] Filed: Jun. 20, 1983

[51] Int. Cl.⁴ .......................... H04N 7/18; H04N 3/02
[52] U.S. Cl. .................................. 358/111; 250/315.3
[58] Field of Search ...................... 358/111; 250/315.3

[56] References Cited

U.S. PATENT DOCUMENTS

| | | | |
|---|---|---|---|
| 3,788,844 | 1/1974 | Sato | 250/315.3 |
| 3,991,311 | 11/1976 | Plumadore | 250/315.3 |
| 4,268,750 | 5/1981 | Cowart | 358/111 |

Primary Examiner—Howard W. Britton
Attorney, Agent, or Firm—Paul R. Miller

[57] ABSTRACT

An apparatus and technique are described for storing a latent radiation image on a photoconductor by way of charge produced on the photoconductor and absorption of light from an object transmitted onto the photoconductor. Read out is provided by scanning a light source over the photoconductor to create a photocurrent which activates a CRT read out device or is stored in an image recording system.

16 Claims, 2 Drawing Figures

METHOD AND APPARATUS FOR DISPLAYING AND READING OUT AN IMAGE

The present invention is directed to an apparatus and technique for obtaining an image of an object and displaying or reading out the image. In particular, the present invention enables the reading out of an image produced by X-ray radiation with high resolution, high efficiency, high speed, and high signal-to-noise ratio.

Among various applications of the present invention are the medical X-ray uses for obtaining images of a person by way of X-rays. Similarly, baggage detection and inspection systems utilizing X-rays can utilize the type of structure provided by the present invention. In addition, the technology of X-ray electrophoretic imaging devices (EPID), such as used in both medical and baggage inspection technology, as well as other uses, can use the arrangements of the present invention.

Accordingly, the present invention is directed to apparatus for displaying and reading out an image.

In particular, electrical charge is distributed over a film of photoconductor material and an object is exposed by a radiation source onto the photoconductive film such that variations in absorption of the radiation cause changes of local voltages at the surface of the film in order to constitute a latent radiation image. Subsequently, structure for scanning light over the surface of the photoconductor on the latent radiation image creates a photocurrent, which when measured provides a magnitude dependent upon the local voltage changes. Structural for reading out these current changes provides a display of the image.

The presently claimed invention further provides a technique for displaying and reading out an image. The technique is carried out by depositing electrical charge over a film of photoconductor material to establish a voltage across the film, directing radiation through an object onto the film, producing local voltages over a surface of the film in response to absorption of the radiation by the object with the local voltages constituting a latent radiation image, scanning light over the surface to create a photocurrent which varies according to the latent image, measuring the photocurrent, and reading out the image thus formed.

These aspects of the presently claimed invention enable suitable display and read out of objects both by way of visible light and X-rays.

Figure 2:
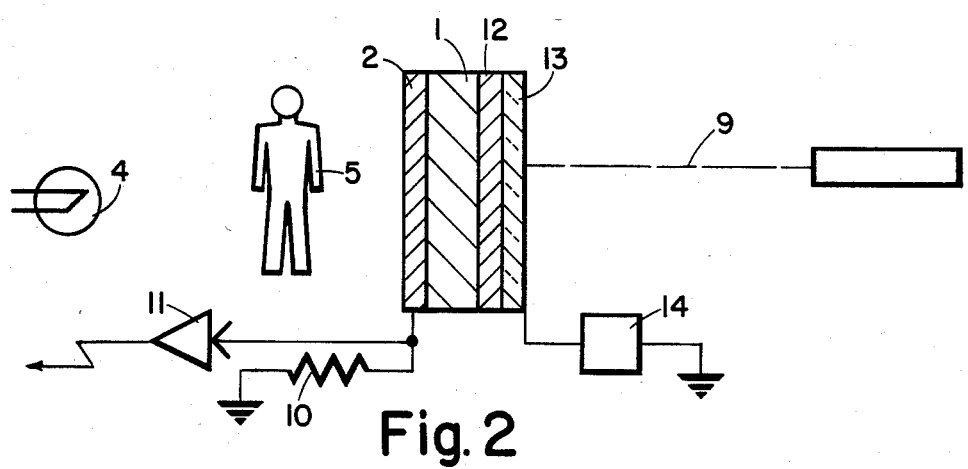

The structure and technique of the presently claimed invention may be seen more clearly by reference to the drawing Figures which illustrate without limitation several embodiments of the present invention, and wherein:

FIG. 1 illustrates one arrangement of the present invention for obtaining and reading out images from a body, and FIG. 2 illustrates another arrangement of such apparatus.

The structure of the present invention, as illustrated in FIG. 1 shows a film of photoconductive material 1, such as a polycrystalline lead oxide (PbO) binder layer, or selenium (Se), which is deposited on a substrate 2. In the event that a radiation source 4 provides X-rays, the thin metal film 2 would preferably be aluminum. On the other hand, for a visible light radiation source 4 a conductive glass, such as NESA glass, or tin oxide, could be used as the front electrode.

Before an image of the object 5 is provided on the photoconductor 1, the photoconductor 1 is charged, for example, by way of a corona discharge device 3 which is moved adjacent to the photoconductor 1. The corona discharge device 3 includes a base electrode 8 connected to a DC power source 6 which sprays electron charges, energized by a high voltage power supply 7, over the film surface. Either electrical charges or ions can be uniformly sprayed over the photoconductor film surface. Alternatively, any electron-beam apparatus forming an electron layer, or a charged layer, over the film 1 could be utilized, but an electron-beam arrangement would require a vacuum.

The corona discharge produces a potential difference $V_0$ between the front and back surfaces of the photoconductor 1. The object 5 whose image is to be displayed is placed near the structure 1, 2 and exposed to radiation produced by the radiation tube 4. As an example, the radiation source 4 may be an X-ray tube providing penetrating radiation through the object 5 which is absorbed in the photoconductive material 1. As a result of this absorption, a spectrum of high energy electrons and/or holes are produced in the photoconductive material 1.

In the technique of spraying charge by high voltage from the corona discharge device 3, the air between the corona discharge device and the photoconductor film becomes conductive. In fact, the air comes to the same voltage as the photoconductor. This acts efficiently to provide charge from the corona discharge onto the photoconductor. After the charge is sprayed essentially over the entire surface of the photoconductor, when the corona discharge device is brought next to the photoconductor, then the corona discharge device is moved away.

After the radiation passes through the object 5 and impinges on the photoconductor 1, the electrons and holes, provided as a result of the radiation, partially neutralize the potential differences between the front and back faces of the photoconductor. This produces a decrease in potential to some value $V_i$. The value $V_i$ varies across the surface of the photoconductor 1 in proportion to the amount of radiation absorbed by the object 5. In this manner, the potential distribution on the surface of the photoconductor constitutes a latent radiation image.

Normally, the photoconductor is thin enough that it does not matter what side the image is formed on. However, the creation of the uniform potential on electrode 2 across the photoconductor 1 essentially provides that the latent image is formed on the surface of the photoconductor away from the electrode 2.

To read out the latent radiation image, radiation, such as a light beam 9, is projected onto, or scanned over, the face of the photoconductor 1. Several possibilities exist for accomplishing this scanning including the use of a green light LED having a wavelength of approximately 0.57 microns. In addition, lasers, such as an argon laser or a krypton laser, can be used to scan light over the photoconductor 1. One essential feature is that the light be at a shorter wavelength than the bandgap of the photoconductor. For a photoconductor 1 such as PbO having a band gap of 2ev or approximately 0.6 microns, the wave length of the light 9 must be shorter than yellow wavelength values. Consequently, the light beam 9 may be from a source producing blue or green wavelengths.

Alternatively to using a laser, light from a lamp may be focussed into a small spot by lenses to scan over the photoconductor 1. Scanning may be accomplished by means of a scanning or rotating mirror.

Whatever type of light that is scanned onto the photoconductor causes a photocurrent having a magnitude depending on the local potentials $V_i$. This photocurrent flows from the photoconductor 1 through the resistor 10 and provides an output signal to be processed through an image-signal processing circuit, such as amplifier 11. The output signal from this amplifier circuit 11 can then be transmitted to a cathode ray tube for display or stored in an image recording system. The amplifier used to process the output signal may be similar to a video amplifier, but need not necessarily have the same band width as video amplifiers.

An alternative embodiment of the present invention is illustrated in FIG. 2. In this arrangement, a thin dielectric layer 12, such as Mylar, silicon oxide, or the like, is deposited onto or bonded to the surface of the photoconductor 1. A semi-transparent conductive film 13 is provided on the dielectric material. The conductive film 13 may be a metal film, it may be NESA glass, or it may be a tin oxide (SnO) especially for use with a light radiation source 4.

This structure is connected to a pulse generator or a power supply 14. A voltage pulse supplied by the power supply to the electrode 13 established a potential difference between the electrode layers 2 and 13. Typical voltage pulses may be of the order of 100 to 600 volts.

In a preferred construction of the present invention, the capacitance of the dielectric layer 12 is made much larger than the capacitance of the photoconductor 1 so that nearly the entire potential difference appears between the front and back surfaces of the photoconductor. Visible light or X-ray exposure, scanning by a light beam 9, and signal read out are performed similarly to the arrangement illustrated in FIG. 1.

Of the several different arrangements of the present invention, the use of an X-ray radiation source or a visible radiation source require different thicknesses of the photoconductor. For example, the use of a light radiation source involves a photoconductor thickness of between 1000 angstroms to 1 micron. For X-ray radiation sources, a photoconductor having a thickness of 100 microns to 1 millimeter is used to absorb the X-rays.

While several embodiments to the present invention have been illustrated and described, the present invention includes all variations and features which may be evident from the claims.

What we claim:

1. In an improved apparatus for displaying and reading out an image comprising a film of photoconductor material, first means for depositing electrical charge over said film to establish a voltage across said film, an object adjacent said film, a radiation source directing radiation through said object to said film, said photoconductive film producing local voltages over a surface of said film in response to absorption of said radiation passing through said object, wherein changes of said local voltages at said surface of said film constitute a latent radiation image, second means for scanning light over said surface to create a photocurrent dependent on said latent radiation image, third means for measuring said photocurrent, said photocurrent having a magnitude dependent upon said local voltages, and fourth means for reading out said image corresponding to said photocurrent, wherein the improvement comprises said first means being a corona discharge device, and
said second means producing light having wavelengths shorter than the bandgap of said photoconductive material.

2. An improved apparatus according to claim 1, wherein said corona discharge device comprises a base electrode for spraying electron charges, a DC power source connected to said base electrode for providing said electron charges, and a high voltage power supply for energizing said electron charges, and wherein said corona discharge device is initially moved adjacent to said film to spray said electron charges over the entire surface of said film, and thereafter moved away from said film.

3. An improved apparatus according to claim 1 or claim 2, wherein said second means includes one of an argon laser or a krypton laser.

4. An improved apparatus according to claim 1 or claim 2, wherein said photoconductor material is PbO.

5. An improved apparatus according to claim 1 or claim 2, wherein said radiation source provides one of visible light or X-radiation.

6. An improved apparatus according to claim 1 or claim 2, wherein said third means includes an amplifier circuit.

7. An improved apparatus according to claim 1 or claim 2, wherein said fourth means includes one of a CRT for display of said image or an image recording system for storing said image.

8. An improved apparatus according to claim 1 or claim 2, wherein said second means includes a visible light source and a lens arrangement for focussing light to a small spot size.

9. An improved apparatus according to claim 8, wherein said light source is a LED.

10. In an improved method for displaying and reading out an image comprising the steps of depositing electrical charge over a film of photoconductor material to establish a voltage across said film, directing radiation through an object onto said film, producing local voltages over a surface of said film in response to absorption of said radiation by said object, said local voltages constituting a latent radiation beam, scanning light over said surface to create a photocurrent, measuring said photocurrent, and reading out said image, wherein the improvement comprises carrying out said step of depositing electrical charges by a corona discharge, and
said step of scanning light by producing light having wavelengths shorter than the bandgap of said photoconductor material.

11. An improved method according to claim 10, wherein said electrical charges are provided from a DC power source to a base electrode and sprayed from said base electrode onto said film, said base electrode being energized by a high voltage power supply to produce said corona discharge, and wherein said corona discharge is initially carried out adjacent said film, and then moved away from said film.

12. An improved method according to claim 10 or claim 11, wherein said light scanned over said surface is laser light from one of an argon laser or a krypton laser.

13. An improved method according to claim 10 or claim 11, wherein said photoconductor material is PbO.

14. An improved method according to claim 10 or claim 11, wherein said radiation is one of visible light or X-radiation.

15. An improved method according to claim 10 or claim 11, wherein said light scanned over said surface is visible light focussed to a small spot size by a lens arrangement.

16. An improved method according to claim 15, wherein said light is formed from an LED.

* * * * *